United States Patent
Kuwahara

(10) Patent No.: US 9,625,899 B2
(45) Date of Patent: Apr. 18, 2017

(54) TEACHING SYSTEM, ROBOT SYSTEM, AND TEACHING METHOD

(71) Applicant: KABUSHIKI KAISHA YASKAWA DENKI, Kitakyushu-shi (JP)

(72) Inventor: Koichi Kuwahara, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 159 days.

(21) Appl. No.: 14/541,142

(22) Filed: Nov. 14, 2014

(65) Prior Publication Data

US 2015/0290801 A1 Oct. 15, 2015

(30) Foreign Application Priority Data

Apr. 10, 2014 (JP) .................. 2014-081470

(51) Int. Cl.
  *G05B 19/18* (2006.01)
  *G05B 19/425* (2006.01)
  *B25J 9/16* (2006.01)

(52) U.S. Cl.
  CPC .......... *G05B 19/425* (2013.01); *B25J 9/1671* (2013.01); *G05B 2219/35012* (2013.01);
  (Continued)

(58) Field of Classification Search
  CPC .... B25J 19/0029; B25J 19/022; B25J 9/1671; B25J 11/0055; B25J 9/1664;
  (Continued)

(56) References Cited

U.S. PATENT DOCUMENTS 5,038,011 A * 8/1991 Nakayama ............... B23H 7/02
  219/69.12
5,552,575 A * 9/1996 Doumanidis ........ B23K 9/1274
  219/121.14
(Continued)

FOREIGN PATENT DOCUMENTS

EP  0696493   2/1996
JP  2006-247677  9/2006
(Continued)

OTHER PUBLICATIONS

Korean Office Action for corresponding KR Application No. 10-2014-0166758, Mar. 7, 2016.
(Continued)

*Primary Examiner* — Khoi Tran
*Assistant Examiner* — Jorge Peche
(74) *Attorney, Agent, or Firm* — Mori & Ward, LLP

(57) ABSTRACT

A teaching system according to an embodiment includes an image generating unit, a start point specifying unit, a via point specifying unit, and a teaching data generating unit. The image generating unit generates a virtual image including a closed processing line set on a workpiece to be processed by a robot. The start point specifying unit specifies a start point at a position outside the processing line on the virtual image. The via point specifying unit specifies a via point on the processing line. The teaching data generating unit generates teaching data relative to the robot for a path that leaves the start point to follow the processing line by way of the via point and returns to the via point.

11 Claims, 11 Drawing Sheets

(52) U.S. Cl.
CPC ............ *G05B 2219/35216* (2013.01); *G05B 2219/40121* (2013.01); *Y02P 90/265* (2015.11)

(58) Field of Classification Search
CPC ........ G05B 19/425; G05B 2219/40121; Y02P 90/265; Y10T 83/0207; Y10T 83/0586
USPC ........................ 700/250, 253, 257, 262, 264
See application file for complete search history.

(56) References Cited

U.S. PATENT DOCUMENTS

| | | | | |
|---|---|---|---|---|
| 5,624,588 | A * | 4/1997 | Terawaki | B23K 9/1272 219/124.34 |
| 5,715,375 | A * | 2/1998 | Ito | B23K 9/1274 700/258 |
| 6,447,223 | B1 * | 9/2002 | Farah | G05B 19/41 318/570 |
| 6,617,544 | B1 * | 9/2003 | Tsukamoto | B23K 26/08 219/121.79 |
| 6,879,704 | B2 * | 4/2005 | Nakamura | H04N 5/272 345/622 |
| 7,130,718 | B2 * | 10/2006 | Gunnarsson | B25J 9/1638 219/124.1 |
| 7,206,667 | B2 * | 4/2007 | Kleinschmitt | G01N 35/0099 414/744.5 |
| 7,974,735 | B2 * | 7/2011 | Irie | B23K 26/0884 318/568.11 |
| 8,412,371 | B2 * | 4/2013 | Komatsu | B23K 26/04 219/121.63 |
| 9,061,419 | B2 * | 6/2015 | Kranz | B25J 9/1633 |
| 2002/0143435 | A1 * | 10/2002 | Terada | B23K 26/0884 700/245 |
| 2003/0146198 | A1 * | 8/2003 | Feistel | B23K 26/0884 219/121.78 |
| 2004/0093119 | A1 * | 5/2004 | Gunnarsson | B25J 9/1638 700/245 |
| 2005/0107918 | A1 * | 5/2005 | Watanabe | B25J 9/1684 700/245 |
| 2005/0222706 | A1 * | 10/2005 | Muraki | G05B 19/40938 700/187 |
| 2006/0181236 | A1 * | 8/2006 | Brogardh | B25J 9/1671 318/568.1 |
| 2006/0212170 | A1 * | 9/2006 | Nagatsuka | B23K 26/0884 700/245 |
| 2006/0287772 | A1 * | 12/2006 | Sandner | B25J 9/1671 700/253 |
| 2010/0262288 | A1 * | 10/2010 | Svensson | B25J 9/1671 700/254 |
| 2010/0283748 | A1 * | 11/2010 | Hsieh | G06F 3/0416 345/173 |
| 2012/0232687 | A1 * | 9/2012 | Mikkelsen | G05B 19/40937 700/122 |
| 2012/0255938 | A1 * | 10/2012 | Oe | B23K 26/0884 219/124.22 |
| 2013/0166071 | A1 * | 6/2013 | Kranz | B25J 9/1633 700/260 |
| 2014/0144895 | A1 * | 5/2014 | Stork Genannt Wersborg | B23K 26/046 219/121.75 |
| 2014/0176938 | A1 * | 6/2014 | Yang | G01B 21/045 356/138 |

FOREIGN PATENT DOCUMENTS

| | | |
|---|---|---|
| JP | 5078770 B2 | 1/2010 |
| KR | 0167020 B1 | 12/1995 |
| WO | WO 2014013605 | 1/2014 |

OTHER PUBLICATIONS

Chinese Office Action for corresponding CN Application No. 201410637748.2, May 25, 2016.

Extended European Search Report for corresponding EP Application No. 14194649.1-1807, Nov. 18, 2015.

Chinese Office Action for corresponding CN Application No. 201410637748.2, Oct. 26, 2016.

* cited by examiner

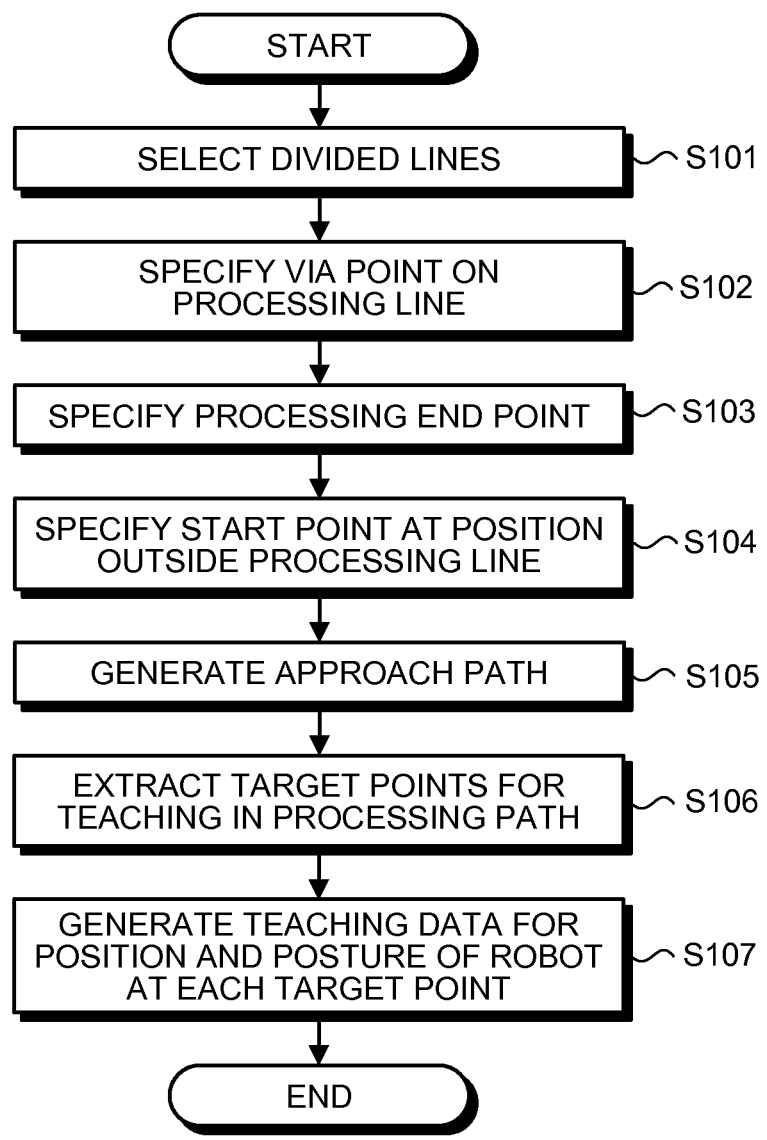

TEACHING SYSTEM, ROBOT SYSTEM, AND TEACHING METHOD

CROSS-REFERENCE TO RELATED APPLICATION

This application is based upon and claims the benefit of priority from the prior Japanese Patent Application No. 2014-081470, filed on Apr. 10, 2014, the entire contents of which are incorporated by reference.

FIELD

The embodiment discussed herein is directed to a teaching system, a robot system, and a teaching method.

BACKGROUND

Conventionally, there have been developed various types of teaching systems that display a three-dimensional model image of a robot or a workpiece on a display device based on three-dimensional computer aided design (CAD) data or the like and create teaching data using the three-dimensional model image.

Use of such teaching systems enables an operator to create teaching data without actually operating the robot or an external axis independent of the robot.

Japanese Patent Application Laid-open No. 2006-247677, for example, discloses a teaching system that creates teaching data off-line relating to positions and postures of a welding robot or a laser emission device held by the welding robot as part of the welding work performed relative to a workpiece such as a vehicle body.

Teaching the robot can, however, be troublesome depending on specific details of processing to be performed even with the above-described teaching system, and the conventional technology has room for further improvement in terms of facilitating teaching.

For example, in a case in which a circular part is cut out from a metal plate, to smooth an outer edge of the part in this case, it is necessary to set a start point for laser emission at a position apart from the circle. It is further necessary to teach the robot a path from the set start point to the circle.

When the path to be taught the robot is complicated, positions and postures of the robot need to be taught for the entire path, which makes the teaching troublesome.

SUMMARY

A teaching system according to an aspect of the embodiment includes an image generating unit, a start point specifying unit, a via point specifying unit, and a teaching data generating unit. The image generating unit generates a virtual image including a closed processing line set on a workpiece to be processed by a robot. The start point specifying unit specifies a start point at a position outside the processing line on the virtual image. The via point specifying unit specifies a via point on the processing line. The teaching data generating unit generates teaching data relative to the robot for a path that leaves the start point to follow the processing line by way of the via point and returns to the via point.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 11 is a flowchart illustrating steps performed by the teaching system.

DESCRIPTION OF EMBODIMENTS

The following describes a teaching system that displays a graphic image of a three-dimensional model of a robot on a display unit, such as a display. The graphic image of a three-dimensional model may be hereinafter referred to as a "virtual image".

While the following describes a laser cutting robot system including a laser cutting robot and a workpiece positioning device (hereinafter referred to as a "positioner"), for example, the present embodiment is not limited thereto. The present embodiment is also applicable to a cutting robot system that includes a cutting robot capable of performing cutting, such as gas cutting and plasma cutting, and a positioner. In the following, the laser cutting robot is referred to as a "robot", and the laser cutting robot system is referred to as a "robot system".

Figure 1:
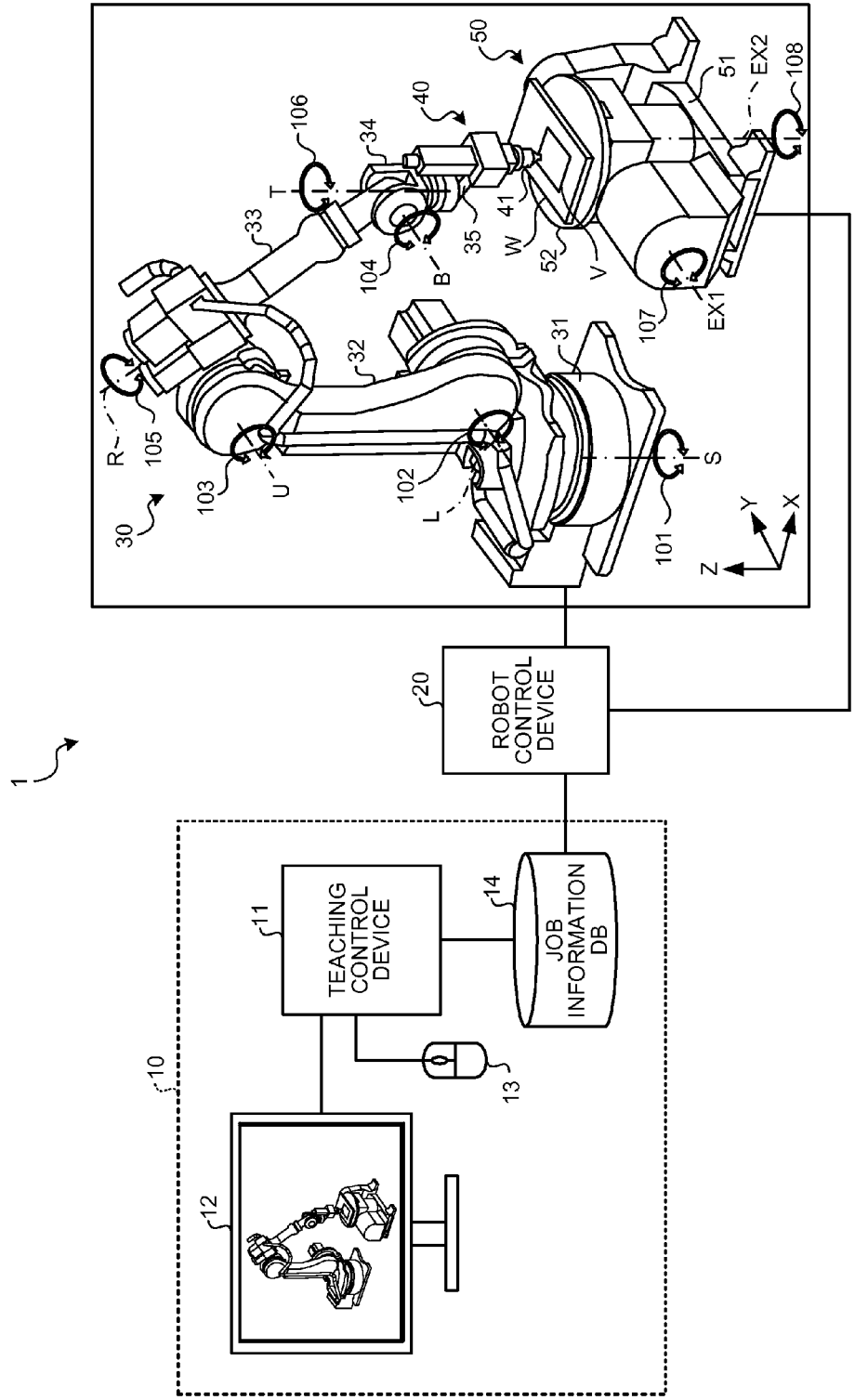
FIG. 1 is a schematic of an entire configuration of a robot system including a teaching system according to an embodiment.

FIG. 1 is a schematic of an entire configuration of a robot system 1 including a teaching system 10 according to an embodiment.

As illustrated in FIG. 1, the robot system 1 includes the teaching system 10, a robot control device 20, a robot 30, and a positioner 50. The teaching system 10 includes a teaching control device 11, a display unit 12, an operating unit 13, and a job information database (DB) 14.

The teaching control device 11 is a controller that collectively controls the teaching system 10 and includes an arithmetic processing device and a memory, for example. The teaching control device 11 is connected to various types of devices of the teaching system 10, such as the display unit 12, in a manner capable of transmitting information.

The teaching control device 11 outputs a virtual image that includes results of simulating motions of the robot 30 and the positioner 50 to the display unit 12 based on an operation performed by an operator with the operating unit 13. The virtual image further includes a virtual image of a workpiece W having a processed surface to be processed by the robot 30 positioned by the positioner 50.

The teaching control device 11 generates a job program for operating the robot 30 and the positioner 50 from the virtual image based on an operation performed by the operator with the operating unit 13 and registers the job program in the job information DB 14.

The display unit 12 is what is called a display device, such as a display. The operating unit 13 is an input device, such as a mouse. The operating unit 13 is not necessarily provided as a hardware component and may be a software component, such as a touch key displayed on a touch panel display.

The job information DB 14 registers therein information on teaching, such as the job program for operating the robot 30 and the positioner 50 and a "teaching point" included in the job program.

The "teaching point", as used herein, refers to information indicating a target position via which each joint of the robot 30 or the revolving mechanism of the positioner 50 is moved to pass when the robot 30 and the positioner 50 are operated. The "teaching point" is stored, for example, as a value of a pulse value generated by each encoder included in a servomotor that drives the corresponding axis of the robot 30 and the positioner 50. Because the robot 30 and the positioner 50 are operated based on information on a plurality of teaching points, the job information DB 14 stores therein a plurality of teaching points in association with each motion (job) of the robot 30 and the positioner 50.

In other words, the job program of the robot 30 or the positioner 50 includes combined information, for example, of a plurality of teaching points, an instruction for an interpolating operation between the teaching points, and an operating instruction for a laser emission device to be described later. The job information DB 14 stores therein information on teaching points for each job program of the robot 30 and the positioner 50. Thus, to reproductively operate the robot 30, for example, the robot 30 is operated based on the job program.

The job information DB 14 is connected to the robot control device 20 serving as a controller that controls an operation of the robot 30 and the positioner 50 in an actual configuration in a manner capable of transmitting information. The robot control device 20 controls various types of operations of the robot 30 and the positioner 50 based on the job program registered in the job information DB 14.

While FIG. 1 illustrates that the job information DB 14 disposed in the teaching system 10 is connected to the robot control device 20, the connection between the job information DB 14 and the robot control device 20 does not necessarily constitute a mandatory requirement.

A possible configuration in which the job information DB 14 and the robot control device 20 are not connected to each other is achieved by storing a job program generated by the teaching system 10 in a predetermined storage unit (not illustrated) in the robot control device 20. Specifically, by copying the job program generated by the teaching system 10 to a medium, such as a universal serial bus (USB) memory, and connecting the medium to the robot control device 20, the job program is stored in a predetermined storage unit (not illustrated) in the robot control device 20 with a predetermined operation.

While the job information DB 14 is separated from the teaching control device 11 in FIG. 1 to facilitate the explanation, the information stored in the job information DB 14 may be stored in a storage unit in the teaching control device 11.

The robot 30 includes a base 31, a first arm 32, a second arm 33, a wrist 34, and a laser emission device 40. The base 31 is fixed to, for example, a floor surface and supports a proximal end of the first arm 32 rotatably about an axis S (see an arrow 101 in FIG. 1) and rotatably about an axis L (see an arrow 102 in FIG. 1).

The proximal end of the first arm 32 is supported by the base 31 as described above, and the distal end of the first arm 32 supports the proximal end of the second arm 33 rotatably about an axis U (refer to the arrow 103 in FIG. 1).

The proximal end of the second arm 33 is supported by the first arm 32 as described above, and the distal end of the second arm 33 supports the proximal end of the flange 34 rotatably about an axis B (refer to the arrow 104 in FIG. 1). Furthermore, the second arm 33 is provided rotatably about an axis R (refer to the arrow 105 in FIG. 1).

The wrist 34 has the proximal end supported by the second arm 33 as described above. The wrist 34 has a distal end supporting rotatably a proximal end of a connecting member 35 about an axis T (see an arrow 106 in FIG. 1), the connecting member 35 connecting the wrist 34 and the laser emission device 40.

The laser emission device 40 is fixed to, and supported by, a distal end of the connecting member 35. The laser emission device 40 includes a laser emission nozzle 41 that emits a laser beam to the processed surface of the workpiece W. The laser emission device 40 is further designed such that gas for efficiently removing molten scrap during laser cutting is sprayed from a distal end of the laser emission nozzle 41.

The positioner 50 includes a base 51 and a placement table 52. The base 51 is fixed to, for example, a floor surface and supports the placement table 52 tiltably about an axis EX1 (see an arrow 107 in FIG. 1).

The placement table 52 serves as a table on which the workpiece W to be processed is placed. The placement table 52, being rotatable about an axis EX2 (see an arrow 108 in FIG. 1), rotates the workpiece W placed thereon. The axes EX1 and EX2 of the positioner 50 are treated as external axes of the robot 30 and controlled by the robot control device 20.

Each joint of the robot 30 and the revolving mechanism of the positioner 50 are provided with a drive source such as a servomotor. The joint of the robot 30 and the revolving mechanism of the positioner 50 are driven based on operating instructions from the robot control device 20.

In the robot system 1 in the actual configuration, a laser oscillator is connected via a cable to the laser emission device 40. In FIG. 1, however, various types of cables including this cable and the laser oscillator are omitted as appropriate.

Figure 2:
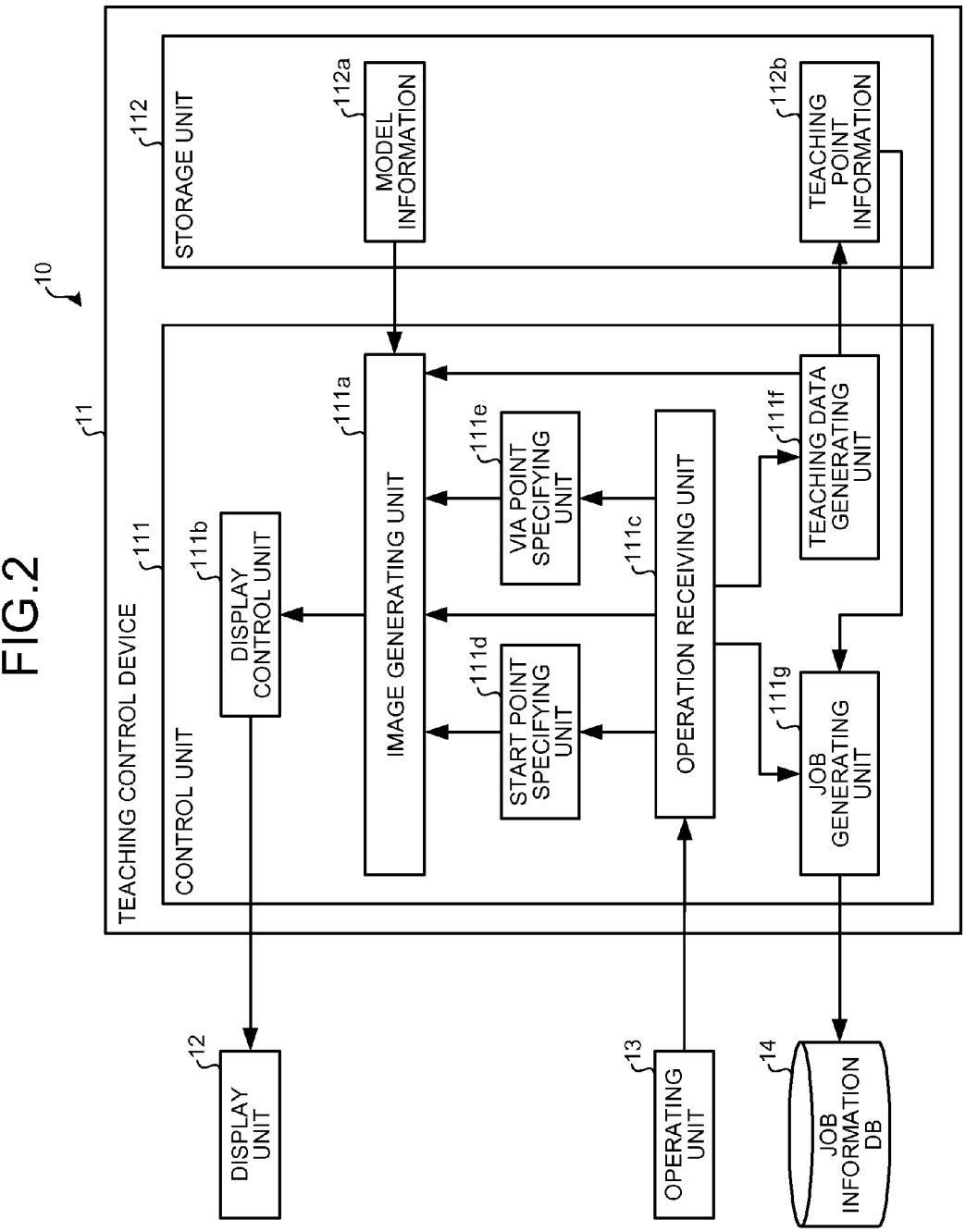
FIG. 2 is a block diagram of a configuration of the teaching system according to the embodiment.

A block configuration of the teaching system 10 according to the embodiment will be described with reference to FIG. 2. FIG. 2 is a block diagram of the configuration of the teaching system 10 according to the embodiment. FIG. 2 illustrates only the components required for the explanation of the teaching system 10 and does not illustrate typical components.

The following mainly describes the internal configuration of the teaching control device 11 with reference to FIG. 2. The following simply explains the display unit 12, the operating unit 13, and the job information DB 14, which are already explained with reference to FIG. 1.

As illustrated in FIG. 2, the teaching control device 11 includes a control unit 111 and a storage unit 112. The control unit 111 includes an image generating unit 111a, a display control unit 111b, an operation receiving unit 111c, a start point specifying unit 111d, a via point specifying unit 111e, a teaching data generating unit 111f, and a job generating unit 111g. The storage unit 112 may, for example, be a hard disk drive, a nonvolatile memory, or any other storage device and stores therein model information 112a and teaching point information 112b.

The image generating unit 111a generates a virtual image of the robot system 1 including the robot 30, the workpiece W, and the positioner 50 that holds the workpiece W based on the model information 112a. The model information 112a includes drawing information defined in advance for each type of the robot 30, the workpiece W, and the positioner 50.

In addition, the image generating unit 111a generates a virtual image including a closed "processing line" set on a processed surface of the workpiece W. The "processing line", as used herein, refers to a cutting line followed by the laser emission device 40 to cut the workpiece W. It is noted that the embodiment will be described for either "drilling" in which a hole having any given shape is pierced in the workpiece W to thereby use the workpiece W having the hole therein as a piece part or "trimming" in which a piece part is the result of the drilling operation cut out from the workpiece W.

Thus, in the embodiment, an expression is used to indicate that the processing line is a closed curve, such as the "closed processing line". The "closed processing line", as used herein, does not, however, require that the line be a completely closed curve, as long as part of the workpiece W can be cut out. For example, to cut out a circular piece part from a workpiece W having a slit therein, the processing line may be divided by the slit; however, the processing line will still be referred to as a "closed processing line".

The image generating unit 111a outputs the generated virtual image to the display control unit 111b. The display control unit 111b displays the virtual image received from the image generating unit 111a on the display unit 12.

The operation receiving unit 111c receives various types of input operations input by the operator from the operating unit 13. Depending on the type of input operation, the operation receiving unit 111c outputs a signal corresponding to the specific operation to the start point specifying unit 111d, the via point specifying unit 111e, the teaching data generating unit 111f, or the job generating unit 111g.

Additionally, the operation receiving unit 111c receives an operation to select the above-described processing line. The "operation to select the processing line", as used herein, refers to selecting at least one from among a plurality of processing lines set in advance on the workpiece W. Specifically, the operator specifies a point on the desired processing line in the virtual image using the operating unit 13, which selects the processing line that includes the specified point. It is here noted that the embodiment will be described for a case in which the processing line is divided by a plurality of divided lines. Thus, the operation receiving unit 111c also receives an operation to select each divided line. The sequence in which the divided lines are selected is used to specify whether a processing direction is clockwise or counterclockwise, and to specify a divided line on which a via point to be described later is set.

The start point specifying unit 111d specifies a start point that assumes a cutting start point of the laser emission device 40 at a position on the workpiece W on the virtual image other than the processing line. The start point specifying unit 111d, when receiving an operation signal to specify the start point from the operation receiving unit 111c, specifies the start point based on the received operation signal.

The via point specifying unit 111e specifies a via point on the processing line on the workpiece W included in the virtual image. The "via point", as used herein, refers to a point the laser emission nozzle 41 accesses first on the processing line. The via point specifying unit 111e, when receiving an operation signal to specify the via point from the operation receiving unit 111c, specifies the via point based on the received operation signal.

The via point specifying unit 111e specifies a processing end point on the processing line. The processing end point is a point at which the laser emission nozzle 41 completes processing the workpiece W after having overlapped the via point. The laser emission nozzle 41's overlappingly cutting the path after the via point results in the piece part being reliably cut out from the workpiece W. It is noted that the processing end point may be identical to the via point.

The teaching data generating unit 111f extracts target points in a path that extends from the start point to follow the processing line by way of the via point and returns back to the via point and generates teaching data for the robot 30 at each of the extracted target points.

When a processing line to be processed and a start point at a position outside the processing line are specified, the teaching data generating unit 111f generates an approach path that assumes the path along which the laser emission nozzle 41 approaches the processing line from the start point. The approach path is generated such that the approach path is tangential to the processing line in at least part near the processing line or the processing line near the via point is tangential to the approach path; specifically, the approach path is generated so as to overlap smoothly the processing line.

When the via point is specified on the processing line, the teaching data generating unit 111f generates the approach path so as to connect the start point to the via point. The teaching data generating unit 111f then generates teaching data for the robot 30, the teaching data covering the approach path from the start point to the via point and a path that follows the processing line by way of the via point and returns back to the via point.

As such, the teaching data generating unit 111f automatically generates the teaching data for the robot 30 covering the entire path including the approach path. This facilitates a teaching operation that tends to be particularly complicated for a cutting operation requiring that a start point be specified at a position not on the processing line. Additionally, even with a complicated processing line, the automatic generation of the approach path eliminates work required for determining the approach path.

The teaching data generating unit 111f registers the generated teaching data in the teaching point information 112b. The teaching data generating unit 111f further outputs the extracted target points to the image generating unit 111a, thereby causing the image generating unit 111a to regenerate the virtual image of the workpiece W including the target points.

The teaching data generating unit 111f performs an inverse kinematics calculation of the position and the posture of the laser emission device 40 at each target point to thereby calculate a teaching value for each joint axis of the robot 30.

The job generating unit 111g, when receiving an operation signal specifying job generation from the operation receiving unit 111c, generates a job program that causes the robot 30 and the positioner 50 in the actual configuration to operate based on the teaching point information 112b and registers the job program in the job information DB 14.

While the description given with reference to FIG. 2 relates to a case in which the teaching control device 11 generates the virtual image including the robot 30 and the positioner 50 based on the model information 112a registered in advance, the present embodiment is not limited thereto. Alternatively, the teaching control device 11 may sequentially acquire information required for the image generation from a host device connected to the teaching control device 11 in a manner capable of communicating with each other.

The following describes a series of specific steps performed by the teaching control device 11 configured as described above. The following description is given with reference to FIGS. 3A to 3D, FIGS. 4A to 4D, FIGS. 5A to 5D, and FIGS. 6A to 6D, as appropriate. In FIGS. 3A to 3D through 6A to 6D, to differentiate parts in virtual images from those in the actual configuration, such as the workpiece W, the virtual images representing elements corresponding to those illustrated in FIG. 1 are denoted by reference numerals to which an apostrophe (') is appended.

The steps to be described hereunder represent those performed by the teaching control device 11 after the image generating unit 111a generates a virtual image of the robot system 1 including the robot 30, the workpiece W, and the positioner 50.

If the position of the start point specified by the start point specifying unit 111d is located inside an area surrounded by the processing line, the teaching control device 11 performs a drilling operation on the workpiece W. If the position of the start point specified by the start point specifying unit 111d is located outside the area surrounded by the processing line, the teaching control device 11 performs a trimming operation on the workpiece W. In the following, the drilling operation will be first described, followed by a description of the trimming operation.

Figure 3A:
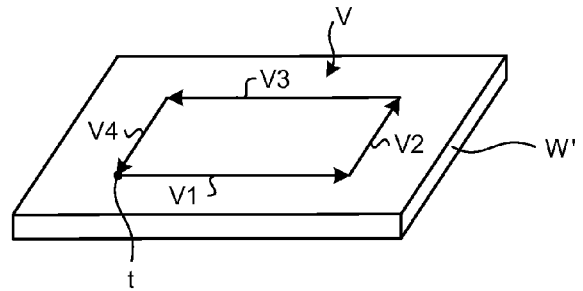
FIG. 3A is a view for explaining an operation to select a divided line.

To determine the processing direction of the robot 30 in the processing line, the operator selects, using the operating unit 13, a divided line from the processing line set on the processed surface of the workpiece W in the virtual image. The selection of the divided line will be described below with reference to FIG. 3A. FIG. 3A illustrates an operation to select a divided line.

Referring to FIG. 3A, the workpiece W in the embodiment is a rectangular metal plate, for example. A processing line V having a rectangular shape in a plan view, for example, is set in advance on the processed surface of a workpiece W' and the processing line V is divided into four divided lines V1 to V4.

FIG. 3A illustrates a case in which the operator first selects the divided line V1 and then selects the divided lines V2, V3, and V4, in sequence. This sequence of selecting the divided lines V1, V2, V3, and V4 results in the processing direction specified counterclockwise. In contrast, if the divided line V1 is first selected and then the divided lines V4, V3, and V2 are selected in that sequence, the processing direction is specified clockwise. It is noted that any one of the divided lines V1, V2, V3, and V4 may be selected first.

As such, the sequence in which the divided lines are selected readily determines the processing direction of the laser emission device 40 in the processing line V.

When the operator first selects the divided line V1 and next the divided line V2, an end of the divided line V1 on the side opposite to the processing direction is set as a reference point t. The reference point t, as used herein, serves as a reference for specifying a via point in the divided line V1. If the operator first selects the divided line V1 and next the divided line V4, an end of the divided line V1 on the side opposite to the processing direction is set as the reference point t.

While FIG. 3A illustrates a case in which the processing line V having a rectangular shape in a plan view is divided into the four divided lines V1 to V4, the number of divisions may be any number of 2 or more. Additionally, FIG. 3A illustrates a case in which the processing line V is a rectangle. The shape of the processing line V is not, however, limited to a rectangle, but may, for example, be a triangle, a trapezoid, a circle, or an ellipse.

Figure 3B:
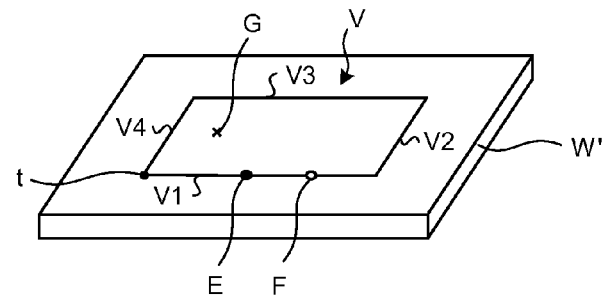
FIG. 3B is a view for explaining an operation to specify a via point, a processing end point, and a start point.

The via point specifying unit 111e, when receiving an operation signal to specify the via point from the operation receiving unit 111c, specifies a via point on the processing line V set on the processed surface on the workpiece W'. The specification of the via point will be described in detail below with reference to FIG. 3B. FIG. 3B illustrates an operation to specify a via point, a processing end point, and a start point.

As illustrated in FIG. 3B, the via point specifying unit 111e specifies a via point E on the divided line V1 selected first in FIG. 3A. The position of the via point E on the divided line V1 is determined by specifying a distance from the reference point t to the via point E on the divided line V1.

When receiving an operation signal to specify the processing end point from the operation receiving unit 111c, the via point specifying unit 111e specifies a processing end point F on the divided line V1. The position of the processing end point F on the divided line V1 is determined by specifying an overlap amount that represents a distance between the via point E and the processing end point F.

When receiving an operation signal to specify the start point from the operation receiving unit 111c, the start point specifying unit 111d specifies a start point at a position not on the processing line V. Because the operation involved here is "drilling", the start point specifying unit 111d specifies a start point G inside an area surrounded by the processing line V on the workpiece W' as illustrated in FIG. 3B. In FIG. 3B, the processing direction is determined to be counterclockwise. Thus, the start point G is specified at a position closer to the reference point t than the via point E. Specifically, the start point G is specified at a position opposite to the processing direction of the laser emission device 40 at the via point E.

Figure 3C:
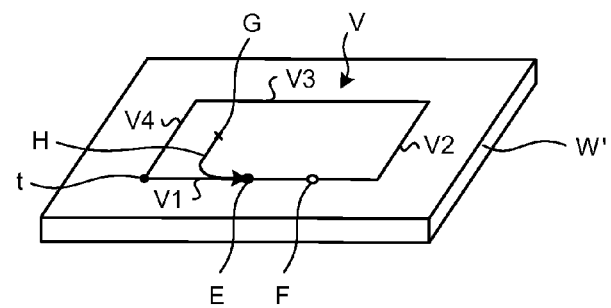
FIG. 3C is a view for explaining an operation to generate an approach path.

When receiving an operation signal to generate an approach path from the operation receiving unit 111c, the teaching data generating unit 111f generates an approach path that represents a path from the start point G to the via point E. The generation of the approach path will be described below with reference to FIG. 3C. FIG. 3C illustrates an operation to generate the approach path.

As illustrated in FIG. 3C, the teaching data generating unit 111*f* generates an approach path H along which the laser emission device 40 leaves the start point G and reaches the via point E. Specifically, the approach path H is generated such that a path extending from the start point G straight to the divided line V1 is generated before the path is gradually bent at a point ahead of the divided line V1 toward a direction identical to the processing direction, so that the approach path H smoothly meets the via point E.

Specifically, the teaching data generating unit 111*f* generates the approach path H such that the divided line V1 is tangential to at least part of the approach path H near the via point E, the approach path H extending from the start point G to the via point E.

As such, the teaching data generating unit 111*f* generates the approach path H such that the divided line V1 is tangential to at least part of the approach path H near the via point E. This allows the workpiece W at the via point E to be cut cleanly.

In addition, the teaching data generating unit 111*f* generates the approach path H oriented at a position near the via point E toward a direction identical to the processing direction of the laser emission device 40 in the processing line V. This enables the laser emission device 40 to continue operating without stopping during the processing at and near the via point E.

Figure 3D:
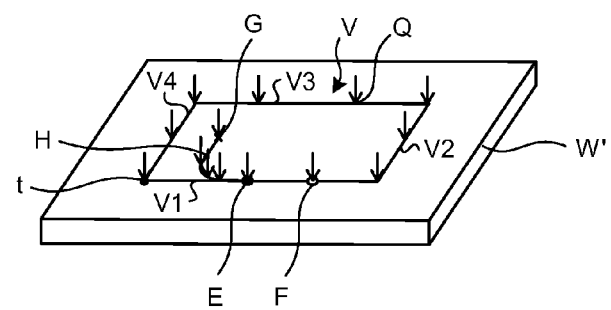
FIG. 3D is a view for explaining an operation to extract a target point for teaching.

The teaching data generating unit 111*f*, when receiving an operation signal to extract teaching target points from the operation receiving unit 111*c*, extracts the teaching target points in a processing path that comprises the approach path H and the processing line V. The extraction of the teaching target points in the processing path will be described in detail with reference to FIG. 3D. FIG. 3D illustrates an operation to extract the teaching target points.

As illustrated in FIG. 3D, the teaching data generating unit 111*f* extracts target points Q for teaching the robot 30 in the processing path including the approach path H and the processing line V. It is noted that, in FIG. 3D, the leading end of each arrow illustrated in FIG. 3D represents a target point Q and the orientation of each arrow indicates the posture of the laser emission device 40.

The target points Q are extracted at predetermined intervals on the processing line V in order to perform stable processing on the workpiece W. The target points Q may still be extracted at shorter intervals on the approach path H than on the processing line V to perform milder processing on the workpiece W, and at even shorter intervals as they get closer to the via point E.

Figure 4A:
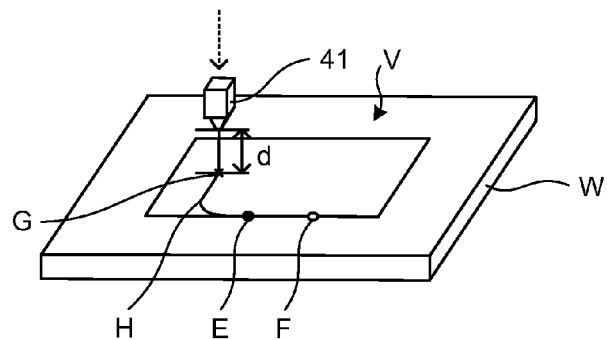
FIGS. 4A to 4C are views for explaining an operation to generate teaching data for positions and postures of a laser emission device.
Figure 4B:
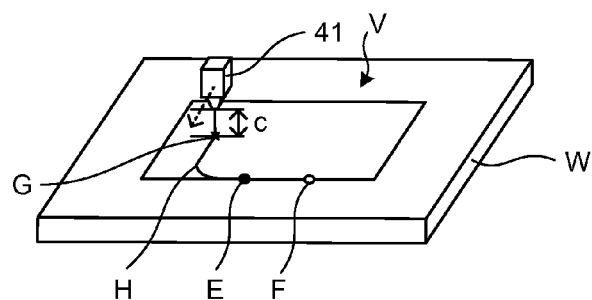
Figure 4C:
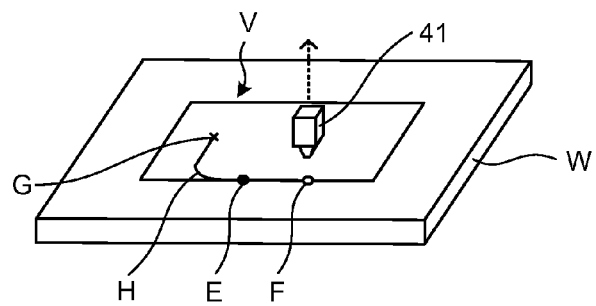

Next, the teaching data generating unit 111*f* generates teaching data for a position and a posture of the laser emission device 40 at each of the target points Q. The generation of the teaching data for the position and the posture of the laser emission device 40 at each of the target points Q will be described with reference to FIGS. 4A to 4C. FIGS. 4A to 4C illustrate an operation to generate teaching data for the positions and the postures of the laser emission device 40.

As illustrated in FIG. 4A, the teaching data generating unit 111*f* generates teaching data for the position and the posture of the laser emission device 40 applicable when the laser emission device 40 performs a piercing operation to drill a hole in the workpiece W at the start point G. Specifically, the teaching data for the position and the posture of the laser emission device 40 is generated so that a distance between the tip of the laser emission nozzle 41 and the processed surface of the workpiece W at the start point G is a distance d at which a hole can be drilled in the workpiece W.

Setting the distance d for the distance between the tip of the laser emission nozzle 41 and the start point G allows scattering of molten scrap produced during piercing to be limited locally. This prevents the workpiece W from being damaged by scattering scrap.

Next, as illustrated in FIG. 4B, the teaching data generating unit 111*f* generates teaching data for the position and the posture of the laser emission device 40 after the piercing operation is completed on the workpiece W at the start point G. Specifically, the teaching data for the position and the posture of the laser emission device 40 is generated so that the distance between the tip of the laser emission nozzle 41 and the start point G is shorter than the distance d and is a distance c at which the workpiece W can be cut by a laser beam.

As illustrated in FIG. 4C, the teaching data generating unit 111*f* generates teaching data for the position and the posture of the laser emission device 40 at each of the target points Q (see FIG. 3D) extracted in the processing path including the approach path H and the processing line V. Specifically, the teaching data for the position and the posture of the laser emission device 40 is generated so that a distance between the tip of the laser emission nozzle 41 and the processed surface of the workpiece W at each of the target points Q is the distance c at which the workpiece W can be cut by a laser beam.

Figure 4D:
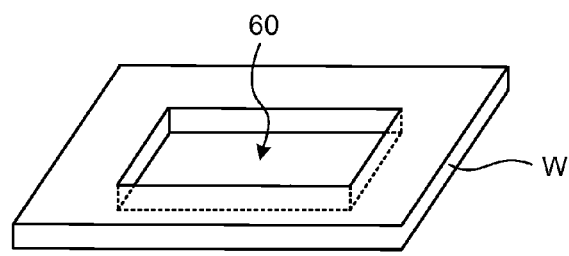
FIG. 4D is a view illustrating the shape of a workpiece after drilling.

FIG. 4D illustrates the shape of the workpiece W that has undergone the drilling operation performed as the laser emission nozzle 41 travels along the processing path including the approach path H and the processing line V based on the teaching data generated as described above. FIG. 4D illustrates the shape of the workpiece W after the drilling operation. As illustrated in FIG. 4D, the area surrounded by the processing line V in the workpiece W is cut out to form a hole 60 having a rectangular shape in a plan view at the center in a surface of the workpiece W.

Steps in the trimming operation performed by the teaching control device 11 will be described below with reference to FIGS. 5A to 5D. The steps identical to those described with reference to FIGS. 3A to 3D and 4A to 4D will be simply described.

Figure 5A:
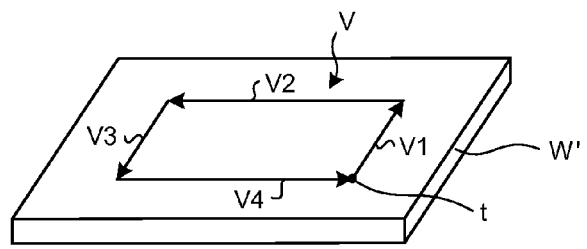
FIG. 5A is a view for explaining an operation to select a divided line.

FIG. 5A illustrates an operation to select the divided lines V1 to V4. As illustrated in FIG. 5A, the operator selects, for example, the divided lines V1, V2, V3, and V4, in sequence, counterclockwise along the processing line V on the workpiece W'.

This sets the processing direction of the laser emission device 40 counterclockwise along the processing line V. In addition, in the example, the end closer to the viewer of the divided line V1 selected first is set as the reference point t.

Figure 5B:
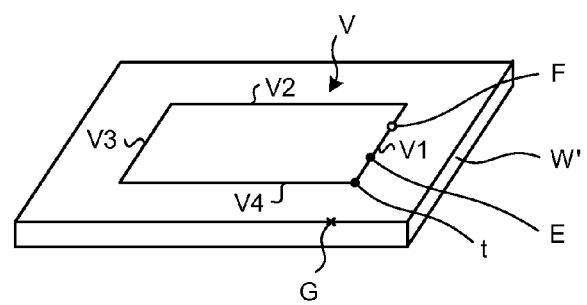
FIG. 5B is a view for explaining an operation to specify a via point, a processing end point, and a start point.

FIG. 5B illustrates an operation to specify the via point E, the processing end point F, and the start point G. As illustrated in FIG. 5B, the via point specifying unit 111*e* specifies the via point E at a position a predetermined distance away from the reference point t on the divided line V1 selected first.

Next, as illustrated in FIG. 5B, the via point specifying unit 111*e* specifies the processing end point F at a position a predetermined distance away in the processing direction from the via point E on the divided line V1 selected first.

Because the operation involved here is "trimming", the start point specifying unit 111*d* specifies the start point G outside an area surrounded by the processing line V on the workpiece W' as illustrated in FIG. 5B. Specifically, the start point G is specified, for example, as an intersection between a straight line passing through the via point E and the reference point t and a circumferential edge of the workpiece W'.

Figure 5C:
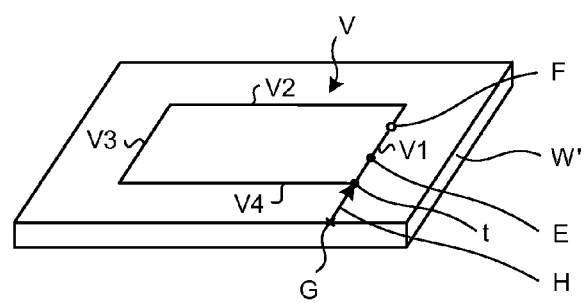
FIG. 5C is a view for explaining an operation to generate an approach path.

FIG. 5C illustrates an operation to generate the approach path H. As illustrated in FIG. 5C, the teaching data generating unit 111f generates the approach path H that represents a path extending from the start point G to the via point E. Specifically, the approach path H is formed as, for example, a straight path that starts with the start point G to reach the via point E by way of the reference point t.

Figure 5D:
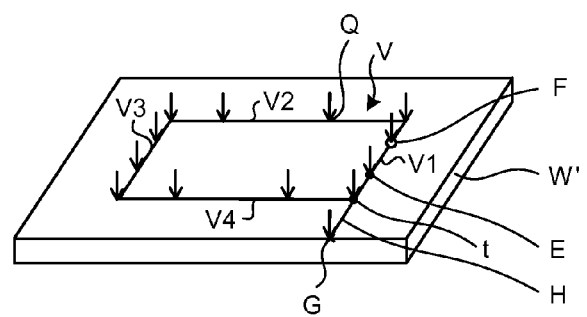
FIG. 5D is a view for explaining an operation to extract a target point for teaching.

Next, as illustrated in FIG. 5D, the teaching data generating unit 111f extracts the target points Q for teaching in the processing path including the approach path H and the processing line V. FIG. 5D illustrates an operation to extract the target points Q for teaching. For example, as illustrated in FIG. 5D, the target points Q are extracted at identical intervals on the approach path H and on the divided lines V1 and V3, and at identical intervals on the divided lines V2 and V4 in order to perform stable processing on the workpiece W.

Figure 6A:
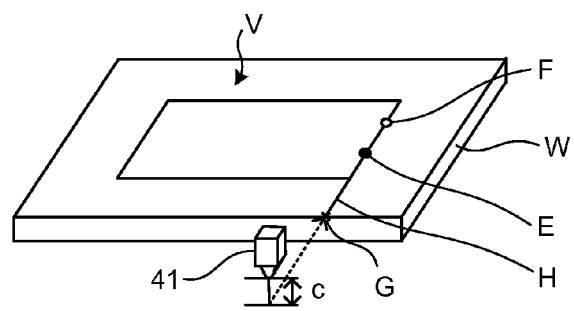
FIGS. 6A to 6C are views for explaining an operation to generate teaching data for positions and postures of the laser emission device.
Figure 6B:
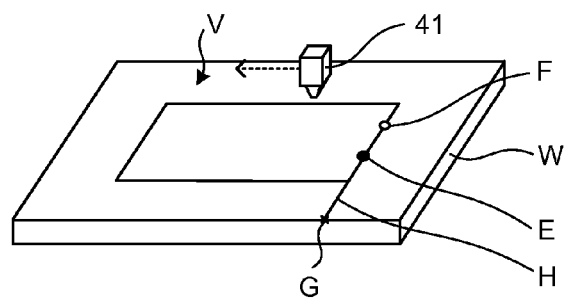
Figure 6C:
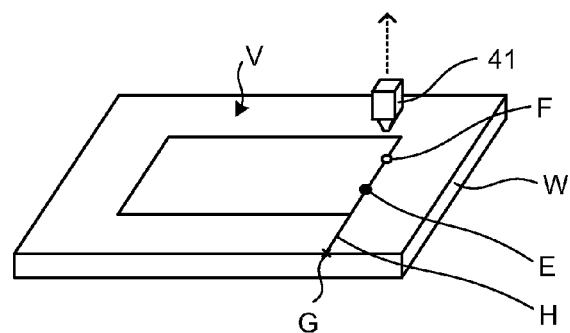

Next, the teaching data generating unit 111f generates teaching data for the position and the posture of the laser emission device 40 at each of the target points Q. The generation of the teaching data will be described with reference to FIGS. 6A to 6C. FIGS. 6A to 6C illustrate an operation to generate teaching data for the positions and the postures of the laser emission device 40.

As illustrated in FIG. 6A, the teaching data generating unit 111f generates the teaching data for the position and the posture of the laser emission device 40 at the start point G for a laser cutting operation performed on the workpiece W. Specifically, the teaching data for the position and the posture of the laser emission device 40 is generated so that the distance between the tip of the laser emission nozzle 41 and the processed surface of the workpiece W is shorter than the distance d during piercing (see FIG. 4A) and is the distance c at which the workpiece W can be cut by a laser beam.

In addition, the teaching data generating unit 111f generates the teaching data for the position and the posture of the laser emission device 40 also for a path extending from a predetermined position outside the workpiece W to the start point G, the predetermined position being present on an extension of a straight line that extends from the reference point t (see FIG. 5D) toward the start point G. On this path, too, the distance between the tip of the laser emission nozzle 41 and the processed surface of the workpiece W is set to the distance c.

As described above, the laser emission nozzle 41 follows the extension of the straight line that extends from the reference point t toward the start point G to thereby advance into the start point G, while maintaining the predetermined distance c from the processed surface of the workpiece W. This allows the workpiece W to be readily cut at the start point G without performing drilling.

In addition, the laser emission nozzle 41 follows an extension of a straight line that extends from the via point E toward the reference point t to thereby advance into the reference point t. This allows the processed surface of the workpiece W along the divided line V1 to be cut cleanly.

As illustrated in FIGS. 6B and 6C, the teaching data generating unit 111f generates teaching data for the position and the posture of the laser emission device 40 at each of the target points Q (see FIG. 5D) extracted in the processing path including the approach path H and the processing line V. Specifically, the teaching data generating unit 111f generates the teaching data for the position and the posture of the laser emission device 40 so that a distance between the tip of the laser emission nozzle 41 and the processed surface of the workpiece W at each of the target points Q is the distance c.

Figure 6D:
FIG. 6D is a view illustrating the shape of a workpiece after trimming.

FIG. 6D illustrates the shape of the workpiece W that has undergone the trimming operation performed as the laser emission nozzle 41 travels along the processing path including the approach path H and the processing line V based on the teaching data generated as described above.

FIG. 6D illustrates the shape of a workpiece Wa after the trimming operation. As illustrated in FIG. 6D, an area excluding the area surrounded by the processing line V in the workpiece W is cut out to produce the workpiece Wa, which has a rectangular shape in a plan view and is smaller than the workpiece W.

In the above-described steps in the trimming operation, the start point specifying unit 111d has been described to specify, as the start point G, the intersection between the straight line passing through the via point E and the reference point t and the circumferential edge of the workpiece W'. The position to specify the start point G is not, however, limited thereto.

Figure 7A:
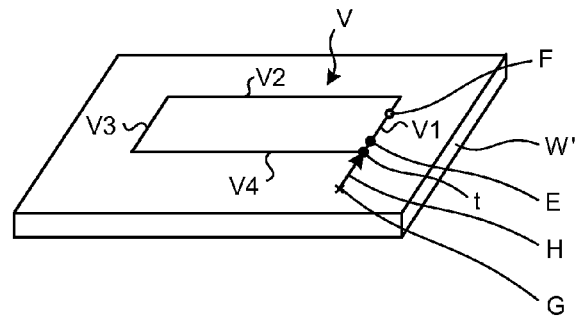
FIGS. 7A to 7C are views for explaining other possible positions that may be specified as the start point by the start point specifying unit.
Figure 7B:
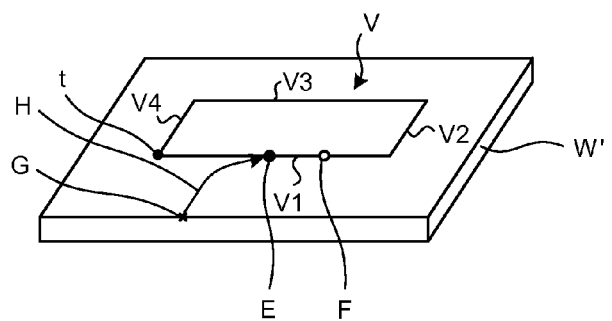
Figure 7C:
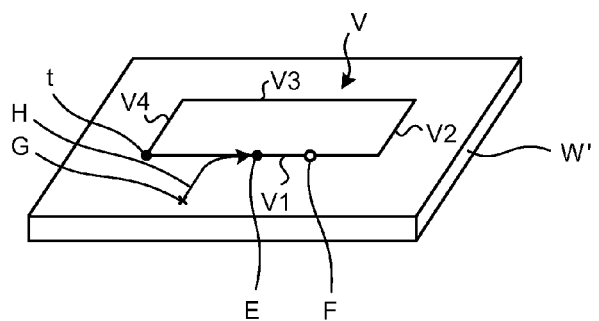

This will be described in detail with reference to FIGS. 7A to 7C. FIGS. 7A to 7C illustrate other possible positions that may be specified as the start point G by the start point specifying unit 111d. In FIGS. 7A to 7D and 8, to differentiate parts in virtual images from those in the actual configuration, such as the workpiece W, the virtual images representing elements corresponding to those illustrated in FIG. 1 are denoted by reference numerals to which an apostrophe (') is appended.

As illustrated in FIG. 7A, the start point specifying unit 111d may specify the start point G at a position on the straight line passing through the via point E and the reference point t and on the inside of the circumferential edge of the workpiece W'. In this case, the teaching data generating unit 111f generates teaching data for the position and the posture of the laser emission device 40 for performing a piercing operation at the start point G on the inside of the circumferential edge of the workpiece W.

The specification of the start point G by the start point specifying unit 111d at a position closer to the reference point t as described above shortens the length of the approach path H, which minimizes unnecessary work that would be performed on the workpiece W.

Alternatively, as illustrated in FIG. 7B, the start point specifying unit 111d may specify the start point G at a position that is on the circumferential edge of the workpiece W' and that an extension from the divided line V4 selected first does not cross. In the example illustrated in FIG. 7B, the teaching data generating unit 111f generates the approach path H such that a path extending from the start point G straight to the divided line V1 is generated before the path is gradually bent at a point ahead of the divided line V1 toward a direction identical to the processing direction, so that the approach path H smoothly meets the via point E. It is noted that the laser emission nozzle 41 advances straight toward the start point G from a position set outside the workpiece W (see FIG. 6A).

Still alternatively, as illustrated in FIG. 7C, the start point specifying unit 111d may specify the start point G at a position that is on the inside of the circumferential edge of the workpiece W' and that the extension from the divided line V4 selected first does not cross. In the example illustrated in FIG. 7C, the teaching data generating unit 111f generates teaching data for the position and the posture of the laser emission device 40 for performing a piercing operation at the start point G. The teaching data generating unit 111f generates the approach path H from the start point G such that the approach path H is a path that smoothly meets the via point E.

Figure 7D:
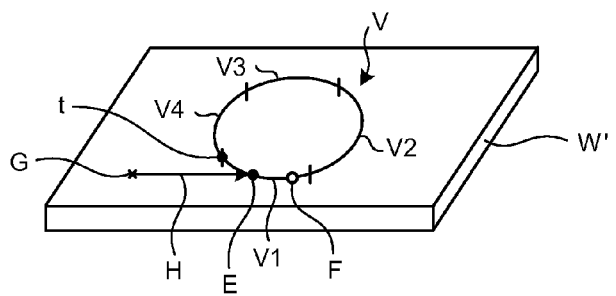
FIG. 7D is a view illustrating the shape of the processing line according to a modification.

The following describes, with reference to FIG. 7D, a case in which the processing line V set on the workpiece W' is a circle. FIG. 7D illustrates the shape of the processing line V according to a modification.

Referring to FIG. 7D, the processing line V having a circular shape in a plan view is set in advance on the workpiece W' and the processing line V is divided into four divided lines V1 to V4. In FIG. 7D, a connection between each pair of two adjacent divided lines V1 to V4 is marked with a delimiting line to clearly indicate the divisions in the processing line V.

As described above, the via point specifying unit 111e specifies the via point E and the processing end point F on the divided line V1 selected first. For a "trimming operation", the start point specifying unit 111d specifies the start point G at a position outside the area surrounded by the processing line V in the workpiece W'. Specifically, the start point G is specified on a tangent at the via point E on the processing line V1.

After the specification, the teaching data generating unit 111f generates the approach path H along which the laser emission device 40 leaves the start point G and reaches the via point E. Specifically, the approach path H is generated so as to extend from the start point G straight to the via point E on the processing line V.

Specifically, the teaching data generating unit 111f generates the approach path H such that the approach path H is tangential to the processing line V, which is a curve.

As such, the teaching data generating unit 111f generates the approach path H such that the approach path H is tangential to the processing line V at a point near the via point E. This allows a portion of the workpiece W at the via point E to be cut cleanly.

Figure 8:
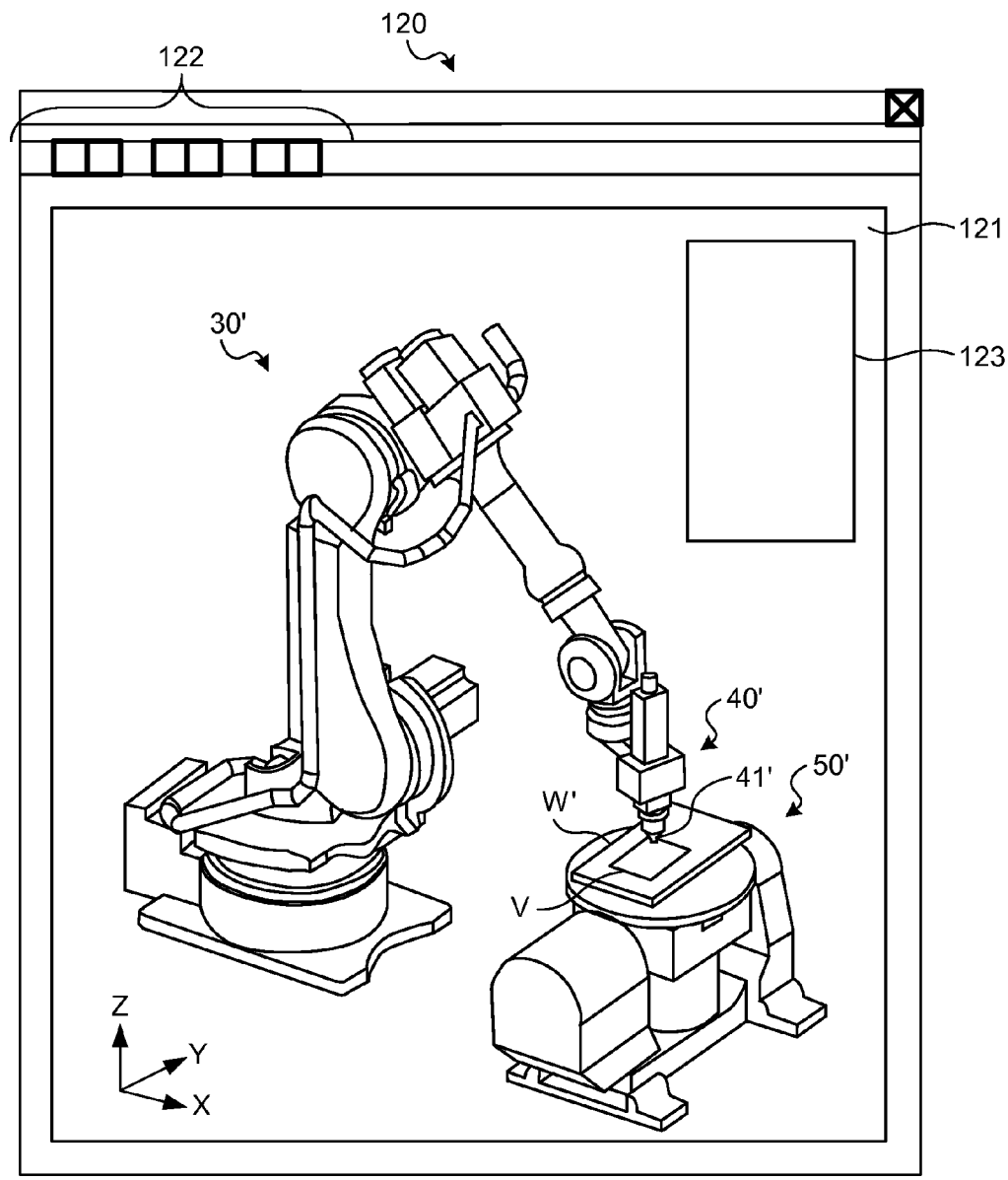
FIG. 8 is a schematic of an example of a virtual image displayed on a display unit.

The following describes an example of the virtual image generated by the image generating unit 111a and displayed on the display unit 12 via the display control unit 111b with reference to FIG. 8.

FIG. 8 is a schematic of an example of the virtual image displayed on the display unit 12. As illustrated in FIG. 8, the virtual image of the robot system 1 including the robot 30' and the positioner 50' is displayed on a display window 120 that assumes one of display areas of the display unit 12.

Specifically, the virtual image is displayed in a virtual image area 121 on the display window 120. The display window 120 also has a graphical user interface (GUI) widget including a button 122 and a dialog box 123.

A rectangular coordinate system is displayed at the lower left part of the virtual image area 121 and serves as a reference coordinate system in the virtual image, serving as a reference in the horizontal direction and vertical direction. Specifically, a direction parallel to the X-Y plane specified by the X-axis and the Y-axis of the reference coordinate system corresponds to the horizontal direction, whereas a direction parallel to the Z-axis of the reference coordinate system corresponds to the vertical direction.

The operator operates the GUI widget and operable components on the virtual image (e.g., the processing line V set on the workpiece W'), thereby performing an instruction operation on the teaching system 10.

Based on the instruction operation performed by the operator via the operating unit 13, the teaching system 10 can drive each joint of the robot 30' and the revolving mechanism of the positioner 50' in the virtual image on the display unit 12. In addition, the teaching system 10 can change the point of view by determining the direction to view the virtual image in display and zoom in and out the display.

The teaching system 10 can also derive the position of each joint of the robot 30' when the laser emission nozzle 41' reaches a specific point in the virtual image by inverse kinematics calculation. Thus, the teaching system 10 can generate and display the virtual image of the robot 30' that has reached the specific point.

Furthermore, the teaching system 10 can read the teaching points and the job program registered in the job information DB 14 based on the instruction operation performed by the operator. Thus, the teaching system 10 can display the virtual image of the robot 30' and the positioner 50' that have reached a specific teaching point and reproduce a series of operation of the robot 30' and the positioner 50' performed by the job program on the display unit 12.

Figure 9A:
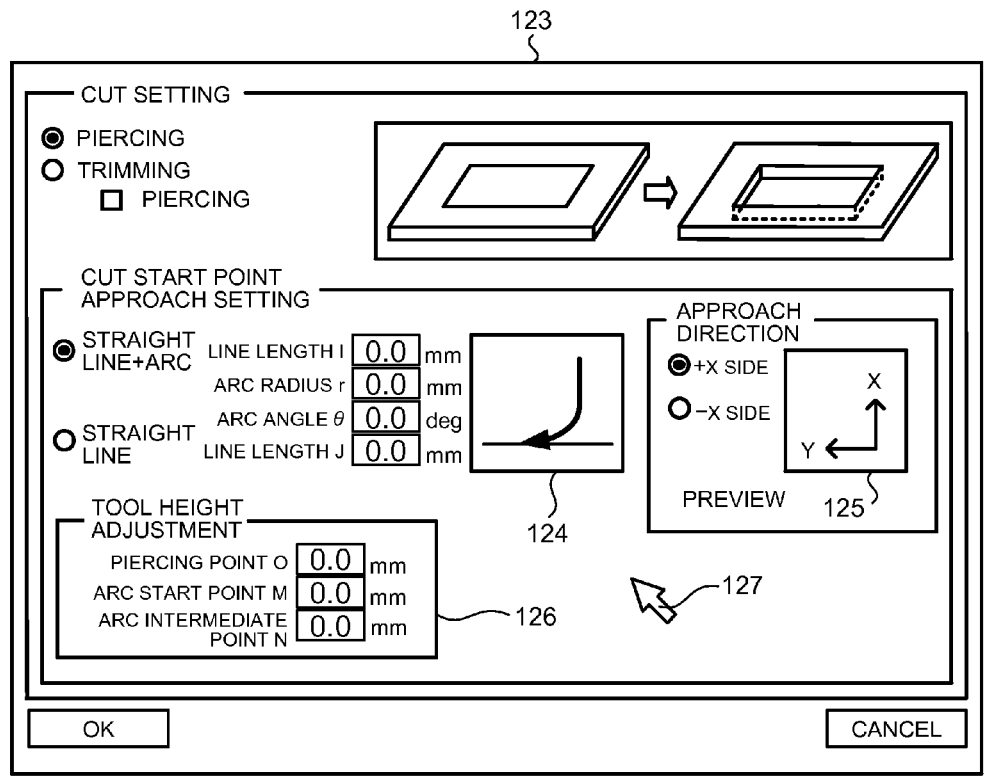
FIG. 9A is a view illustrating an exemplary operating screen on which cutting details are set.
Figure 9B:
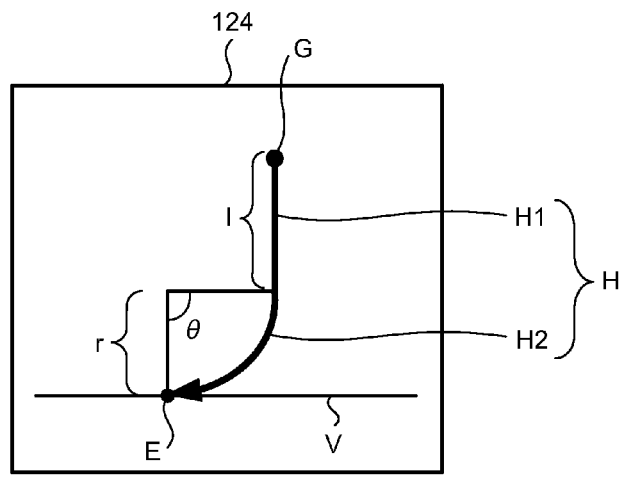
FIG. 9B is a view illustrating part of the operating screen illustrated in FIG. 9A.
Figure 10A:
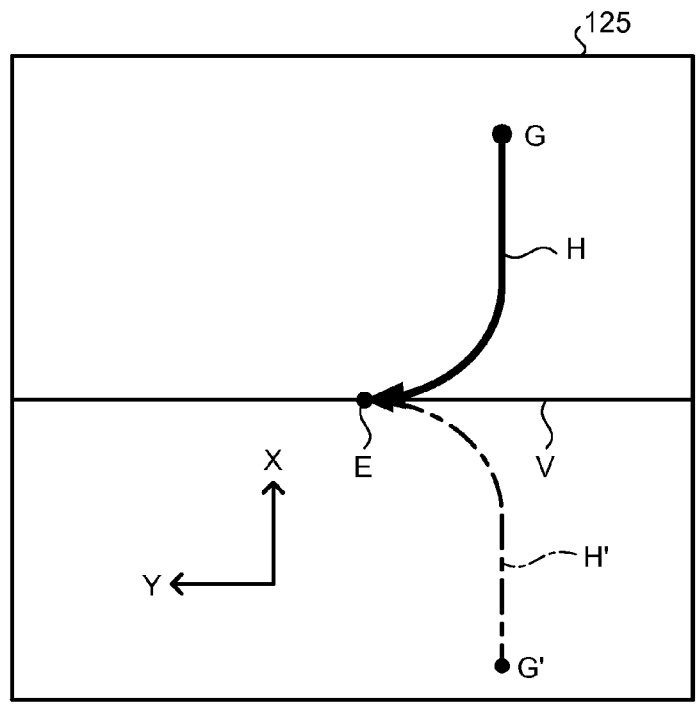
FIGS. 10A and 10B are views illustrating part of the operating screen illustrated in FIG. 9A.
Figure 10B:
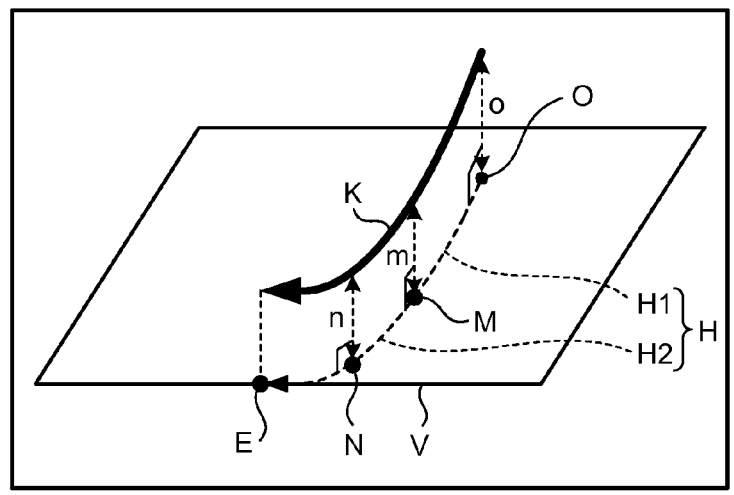

The following describes, with reference to FIGS. 9A to 10B, operations performed relative to the workpiece W by the operator, for example, to determine a specific processing method and set processing conditions on the screen displayed on the display unit 12. FIG. 9A illustrates an exemplary operating screen on which cutting details are set. FIGS. 9B, 10A, and 10B each illustrate part of the operating screen illustrated in FIG. 9A.

As illustrated in FIG. 9A, when determining the processing method, the operator selects either "drilling" or "trimming" displayed in the dialog box 123 using a pointer 127.

When the operator selects "drilling", the workpiece W having a closed processing line V set thereon and the workpiece W having a hole 60 formed at the center therein appear simultaneously in the dialog box 123. The display of both the workpiece W before processing and the workpiece W after processing allows the operator to visually confirm that "drilling" has been selected.

When "drilling" has been selected, the start point specifying unit 111d indicates in the dialog box 123 that a candidate area for the start point G falls within the area surrounded by the processing line V in the workpiece W. Specifically, for example, the inside of the area surrounded by the processing line V in the workpiece W before processing displayed in the dialog box 123 is colored to thereby indicate that the colored area is the candidate area for the start point G.

When "trimming" has been selected, the start point specifying unit 111d indicates in the dialog box 123 that the candidate area for the start point G falls outside the area surrounded by the processing line V in the workpiece W. Specifically, for example, the outside of the area surrounded by the processing line V in the workpiece W before processing displayed in the dialog box 123 is colored to thereby indicate that the colored area is the candidate area for the start point G.

The coloring of the inside or outside of the area surrounded by the processing line V in the workpiece W before processing displayed in the dialog box 123 as described above allows the operator to readily and quickly confirm the candidate area for the start point G.

After having determined the processing method, the operator sets the approach path H, which represents the operation to determine the processing conditions. Specifically, as illustrated in FIG. 9A, the operator selects either "straight line+arc" or "straight line" displayed in the dialog box 123 using the pointer 127.

When the operator selects "straight line+arc", part of the processing line V and the approach path H appear in a display field 124 in the dialog box 123. FIG. 9B illustrates a specific shape of the approach path H that appears in the display field 124 when "straight line+arc" is selected.

As illustrated in FIG. 9B, the approach path H that connects the start point G and the via point E includes a straight-line portion H1 that extends from the start point G perpendicularly to the processing line V and an arc portion H2 that extends arcuately from one end of the straight-line portion H1 to the via point E.

The straight-line portion H1 has a length l that is determined when any numerical value is entered in the input field of "line length l" in the dialog box 123 illustrated in FIG. 9A. The arc portion H2 has an arc length that is determined when any numerical values are entered in the input fields of "arc radius r" and "arc angle θ" in the dialog box 123

Thus, the operator can easily generate the approach path H connecting the start point G and the via point E through a simple operation of entering any numerical values in the input fields of "line length l", "arc radius r", and "arc angle θ".

When "straight line+arc" has been selected, the operator next sets an approach direction, which represents one of the operations to determine the processing conditions. Specifically, the operator selects either "+X side" or "−X side" displayed in the dialog box 123 illustrated in FIG. 9A using the pointer 127.

When the operator selects "+X side", the approach direction of the approach path H toward the via point E appears in a display field 125 in the dialog box 123. FIG. 10A illustrates the approach direction of the approach path H toward the via point E when "+X side" is selected, the approach direction appearing in the display field 125.

As illustrated in FIG. 10A, in the display field 125, the via point E specified on the processing line V is defined as an origin 0. The display field 125 also displays at a lower left part thereof an XY coordinate system that determines the approach direction of the approach path H toward the via point E. The selection of "+X side" results in the approach path H being set such that the direction from the start point G disposed in an upper area along the processing line V toward the via point E is the approach direction.

When the operator selects "−X side", an approach path H' is set such that the direction from a start point G' disposed in a lower area along the processing line V toward the via point E is the approach direction, as illustrated in FIG. 10A.

Thus, the operator can easily set the approach direction of the approach path H toward the via point E through a simple operation of selecting, with the pointer 127, either "+X side" or "−X side" displayed in the dialog box 123.

After having determined the approach direction, the operator sets a tool height adjustment, which represents one of the operations to determine the processing conditions. Specifically, the operator enters any numerical values in the input fields of "piercing point O", "arc start point M", and "arc intermediate point N" that are displayed in the dialog box 123 illustrated in FIG. 9A. This sets the distance between the tip of the laser emission nozzle 41 and the processed surface of the workpiece W at each of the different points in the approach path H.

FIG. 10B is a line drawing that illustrates the distance between the tip of the laser emission nozzle 41 and the processed surface of the workpiece W at each of the different points displayed in a display field 126. As illustrated in FIG. 10B, the following points are set on the approach path H: a point O at which piercing at the start point G is performed; a point M at which the straight-line portion H1 and the arc portion H2 are connected to each other; and a point N that represents an intermediate point of the arc portion H2 in the longitudinal direction thereof.

Distances o, m, and n between the tip of the laser emission nozzle 41 and the processed surface of the workpiece W at the points O, M, and N, respectively, are set when the operator enters any numerical values in the input fields of "piercing point O", "arc start point M", and "arc intermediate point N" in the dialog box 123. In FIG. 10B, reference numeral K denotes a trajectory followed by the laser emission nozzle 41 traveling along the approach path H at a set height.

Thus, the operator can easily set the distances o, m, and n between the tip of the laser emission nozzle 41 and the processed surface of the workpiece W along the approach path H through a simple operation of entering any numerical values in the input fields of "piercing point O", "arc start point M", and "arc intermediate point N", respectively.

The operator can cause the laser emission nozzle 41 to be gradually closer to the processed surface of the workpiece W toward the via point E in the perpendicular direction by setting smaller numerical values in order of "piercing point O", "arc start point M", and "arc intermediate point N". This allows the workpiece W to be smoothly cut.

When "trimming" has been selected, the operator can also select, with the pointer 127, "piercing" displayed in the dialog box 123.

If the operator selects "trimming" only and does not select "piercing", the laser emission nozzle 41 advances toward the start point G specified on the circumferential edge of the workpiece W from a position outside the workpiece W. If the operator selects both "trimming" and "piercing", the start point G is specified at a position outside the area surrounded by the processing line V in the workpiece W and inside the workpiece W.

The following describes steps performed by the control unit 111 of the teaching system 10 according to the embodiment with reference to FIG. 11. FIG. 11 is a flowchart illustrating the steps performed by the teaching system 10.

As illustrated in FIG. 11, the control unit 111 first selects the divided lines V1 to V4 from the closed processing line V set on the processed surface of the workpiece W in the virtual image (workpiece W') (step S101). The control unit 111 next specifies the via point E on the processing line V in the workpiece W in the virtual image (workpiece W') (step S102).

After the via point E has been specified, the control unit 111 specifies the processing end point F on the processing line V in the workpiece W in the virtual image (workpiece W') (step S103). The control unit 111 then specifies the start point G at a position outside the processing line V on the processed surface of the workpiece W in the virtual image (workpiece W') (step S104).

With all these points specified, the control unit 111 generates the approach path H as the path extending from the start point G to the via point E (step S105). The control unit 111 then extracts the target points Q for teaching the robot 30 in the processing path including the approach path H and the processing line V (step S106).

Next, the control unit 111 generates the teaching data for the position and the posture of the robot 30 at each of the target points Q (step S107).

While in the steps performed by the teaching system 10 described above, the via point E is first specified on the processing line V in the workpiece W' and then the start point G is specified at a position outside the processing line V in the workpiece W', the order of the steps is not limited to this. For example, the start point G may be first specified at a position outside the processing line V in the workpiece W' and the via point E is next specified on the processing line V in the workpiece W'.

As described heretofore, the teaching system and the robot system according to the embodiment comprise the image generating unit, the start point specifying unit, the via point specifying unit, and the teaching data generating unit.

The image generating unit generates a virtual image including a closed processing line set on a workpiece to be processed by a robot. The start point specifying unit specifies a start point at a position outside the processing line on the virtual image.

The via point specifying unit specifies a via point on the processing line. The teaching data generating unit generates teaching data for the robot for a path that leaves the start point to follow the processing line via the via point and returns to the via point.

As described heretofore, the teaching method according to the embodiment comprises: generating a virtual image; specifying a start point; specifying a via point; and generating teaching data.

The generating of a virtual image generates a virtual image including a closed processing line set on a workpiece to be processed by a robot. The specifying of a start point specifies a start point at a position outside the processing line on the virtual image. The specifying of a via point specifies a via point on the processing line. The generating generates teaching data relative to the robot for a path that leaves the start point to follow the processing line by way of the via point and returns to the via point.

Thus, the teaching system, the robot system, and the teaching method according to the embodiment facilitate an operation to teach the robot.

While the embodiment has been described for a case in which the processed surface of the workpiece is planar and the teaching data is generated for positions and postures of the laser emission device relative to the plane, the present embodiment is not limited to this. For example, the processed surface of the workpiece may be a curved surface, and the teaching data can be generated for positions and postures of the laser emission device relative to the curved surface.

While the robot is a six-axis single-arm robot in the embodiment above, the number of axes and arms is not limited thereto.

While the operator mainly uses a mouse as the operating unit and performs an input operation and other operations with the mouse in the embodiment above, the embodiment is not limited thereto. The display unit may be a touch panel supporting what is called multi-touch, and the input operation may include a multi-touch operation performed on the touch panel, for example.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A teaching system comprising:
   an image generating unit that generates a virtual image including a closed processing line set on a workpiece to be processed by a robot;
   a start point specifying unit that specifies a start point at a position other than positions on the closed processing line on the virtual image;
   a via point specifying unit that specifies a via point on the closed processing line; and
   a teaching data generating unit that generates teaching data relative to the robot for a path that leaves the start point to follow the closed processing line by way of the via point and returns to the via point, wherein the teaching data is performed by the robot; wherein
   the closed processing line is divided into a plurality of divided lines,
   the via point specifying unit determines a direction of sequential selection of two adjacent divided lines as a processing direction of the robot on the closed processing line, and specifies the via point on a divided line of the plurality of divided lines, and
   the start point specifying unit specifies the start point at the position on a side of a reference line extending orthogonally to the divided line and through the via point, the side being opposite to the processing direction with respect to the via point specified on the divided line.

2. The teaching system according to claim 1, wherein
   the robot includes a laser emission device disposed at a distal end of an articulated arm, and
   the teaching data generating unit generates the teaching data for the robot to perform processing on the workpiece using the laser emission device.

3. The teaching system according to claim 2, wherein, when drilling in the workpiece is specified, the start point specifying unit presents an inside area surrounded by the closed processing line as a candidate area for the start point and, when trimming in the workpiece is specified, the start point specifying unit presents an area outside the inside area as a candidate area for the start point.

4. The teaching system according to claim 3, wherein, when the start point is specified on the workpiece, the start point specifying unit sets a piercing operation for processing to be performed at the start point, the piercing operation drilling a hole in the workpiece with a fixed laser emission position.

5. The teaching system according to claim 2, wherein, when the start point is specified on the workpiece, the start point specifying unit sets a piercing operation for processing to be performed at the start point, the piercing operation drilling a hole in the workpiece with a fixed laser emission position.

6. The teaching system according to claim 1, wherein, when drilling in the workpiece is specified, the start point specifying unit presents an inside area surrounded by the closed processing line as a candidate area for the start point and, when trimming in the workpiece is specified, the start point specifying unit presents an area outside the inside area as a candidate area for the start point.

7. The teaching system according to claim 6, wherein, when the start point is specified on the workpiece, the start point specifying unit sets a piercing operation for processing to be performed at the start point, the piercing operation drilling a hole in the workpiece with a fixed laser emission position.

8. The teaching system according to claim 1, wherein the path includes an approach path extending from the start point to the via point, and the approach path is tangential to the closed processing line at the via point.

9. The teaching system according to claim 8, wherein a direction of the approach path near the via point is identical to the processing direction of the robot at the via point on the closed processing line.

10. A teaching method comprising:
generating a virtual image including a closed processing line set on a workpiece to be processed by a robot;
specifying a start point at a position other than positions on the closed processing line on the virtual image;
dividing the closed processing line into a plurality of divided lines;
determining a direction of sequential selection of two adjacent divided lines as a processing direction of the robot on the closed processing line;
specifying a via point on a divided line of the plurality of divided lines;
specifying the start point at the position on a side of a reference line extending orthogonally to the divided line and through the via point, the side being opposite to the processing direction with respect to the via point specified on the divided line; and
generating teaching data relative to the robot for a path that leaves the start point to follow the processing line by way of the via point and returns to the via point, wherein the teaching data is performed by the robot.

11. A robot system comprising:
a robot; and
a teaching system that teaches a movement of the robot, the teaching system comprising:
an image generating unit that generates a virtual image including a closed processing line set on a workpiece to be processed by a robot;
a start point specifying unit that specifies a start point at a position other than positions on the closed processing line on the virtual image;
a via point specifying unit that specifies a via point on the closed processing line; and
a teaching data generating unit that generates teaching data relative to the robot for a path that leaves the start point to follow the closed processing line by way of the via point and returns to the via point, wherein the teaching data is performed by the robot; wherein
the closed processing line is divided into a plurality of divided lines,
the via point specifying unit determines a direction of sequential selection of two adjacent divided lines as a processing direction of the robot on the closed processing line, and specifies the via point on a divided line of the plurality of divided lines, and
the start point specifying unit specifies the start point at the position on a side of a reference line extending orthogonally to the divided line and through the via point, the side being opposite to the processing direction with respect to the via point specified on the divided line.

* * * * *